United States Patent
Lee et al.

(10) Patent No.: US 9,329,392 B2
(45) Date of Patent: May 3, 2016

(54) WEARABLE DISPLAY

(71) Applicant: Samsung Display Co., Ltd., Yongin, Gyeonggi-Do (KR)

(72) Inventors: Kwang Hoon Lee, Anyang-si (KR); Mu Gyeom Kim, Hwaseong-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/464,253

(22) Filed: Aug. 20, 2014

(65) Prior Publication Data
US 2015/0198810 A1 Jul. 16, 2015

(30) Foreign Application Priority Data
Jan. 14, 2014 (KR) ........................ 10-2014-0004608

(51) Int. Cl.
| | |
|---|---|
| *G02B 27/01* | (2006.01) |
| *G06F 3/03* | (2006.01) |
| *G02B 5/02* | (2006.01) |
| *G02B 6/00* | (2006.01) |
| *G06F 3/042* | (2006.01) |

(52) U.S. Cl.
CPC .............. *G02B 27/0176* (2013.01); *G02B 5/02* (2013.01); *G02B 6/00* (2013.01); *G02B 27/017* (2013.01); *G02B 27/0172* (2013.01); *G06F 3/0304* (2013.01); *G06F 3/042* (2013.01); *G02B 2027/0118* (2013.01); *G02B 2027/0178* (2013.01); *G06F 2203/04109* (2013.01)

(58) Field of Classification Search
CPC ....... G06F 3/011; G06F 1/163; G06F 27/017; G06F 27/0172; G06F 2027/0178; G06F 2203/0419
See application file for complete search history.

(56) References Cited

U.S. PATENT DOCUMENTS

| | | | |
|---|---|---|---|
| 7,705,835 B2 | 4/2010 | Eikman | |
| 8,217,856 B1 | 7/2012 | Petrou | |
| 2003/0234351 A1 | 12/2003 | Chee | |
| 2006/0044265 A1 | 3/2006 | Min | |
| 2011/0157092 A1 | 6/2011 | Yang | |
| 2011/0199340 A1 | 8/2011 | Aikio et al. | |
| 2012/0069448 A1* | 3/2012 | Sugihara | G02B 27/0176 359/643 |
| 2012/0086623 A1 | 4/2012 | Takagi et al. | |
| 2012/0133598 A1 | 5/2012 | Fan et al. | |
| 2012/0269403 A1 | 10/2012 | Blair | |
| 2013/0076599 A1* | 3/2013 | Saito | G09G 5/00 345/8 |
| 2013/0127713 A1 | 5/2013 | Yang et al. | |
| 2013/0248691 A1* | 9/2013 | Mirov | G01J 1/32 250/214 AL |
| 2013/0267309 A1* | 10/2013 | Robbins | A63F 13/10 463/31 |
| 2015/0002465 A1* | 1/2015 | Tsukahara | G06F 3/0362 345/174 |
| 2015/0103021 A1* | 4/2015 | Lim | G06F 3/041 345/173 |
| 2015/0153573 A1* | 6/2015 | Komatsu | G02B 27/0172 345/8 |

FOREIGN PATENT DOCUMENTS

JP    10-0894544 B1    4/2009

* cited by examiner

*Primary Examiner* — Lixi C Simpson
(74) *Attorney, Agent, or Firm* — Knobbe, Martens, Olson & Bear, LLP

(57) ABSTRACT

A wearable display device is disclosed. In one aspect, the wearable display device includes an image source configured to output an image and an optical housing at least a portion of which is configured to be placed in front of a user's eye. The optical housing includes a waveguide configured to receive the light from the image source and guide the output image, at least one inclined surface configured to reflect the guided image to the user's eye, and a first sensor formed on the waveguide and configured to sense contact between an object and the waveguide. The waveguide and the inclined surface are integrally formed.

19 Claims, 7 Drawing Sheets

WEARABLE DISPLAY

CROSS-REFERENCE TO RELATED APPLICATION

This application claims priority to and the benefit of Korean Patent Application No. 10-2014-0004608 filed in the Korean Intellectual Property Office on Jan. 14, 2014, the entire contents of which are incorporated herein by reference.

BACKGROUND

1. Field

The described technology generally relates to a wearable display which can be worn, for example, like eyeglasses.

2. Description of the Related Technology

Recently, wearable display devices have been developed which enlarge images output from a display device by use of an optical system. These virtual images are overlaid with the user's view of the environment to provide an "augmented reality" view. Such wearable display devices also generate the images to appear as if they are being viewed on a wide screen separated from the user by a predetermined distance. Wearable display devices are placed on the user's head similar to eyeglasses and are referred to as head mounted display devices.

Since head mounted display devices are worn on the body, the ergonomic structure of the devices is important so that users do not feel discomfort. Further, since virtual video rather than actual video is viewed through the display, the influence of information that is different from reality as perceived by the user must also be considered.

Head mounted display devices can be classified based on the number of images displayed to the user. For example, a single display image can be viewed with a single eye in a monocular display and two display images can be viewed with an optical system having two channels in a binocular display. The binocular display can be used to provide images with slightly different views to realize a 3D image and can provide the same image to both eyes to realize a 2D image.

Typically, the same image is output by the two display devices of a 2D binocular head mounted display device and are input to the user's eyes through eyepieces. That is, the two display devices output the same images and two lenses forms virtual images provided to the user's eyes.

The above information disclosed in this Background section is only intended to facilitate the understanding of the background of the described technology and therefore it may contain information that does not constitute the prior art that is already known in this country to a person of ordinary skill in the art.

SUMMARY OF CERTAIN INVENTIVE ASPECTS

One inventive aspect is a wearable display device including a housing that is integrally formed from a position at which light is received to a region where light is output to a user's eyes and including a contact sensor on the housing.

Another aspect is a wearable display device including a light source for outputting light including a visual image, and an optical housing for transmitting the light and allowing the device to be worn by a user, wherein the optical housing includes a waveguide through which the output light is guided, an inclined surface for providing the light transmitted through the waveguide to the user's eyes, and a contact sensor provided on the waveguide, wherein the optical housing is an integral type.

The optical housing is made with one or more of poly (methylmethacrylate) (PMMA), polycarbonate (PC), and glass.

The optical housing is manufactured by injection molding.

The wearable display device includes a sensing input unit for sensing generation of a diffused reflection on the contact sensor when contact is generated at the contact sensor.

The diffused reflection is generated by frustrated total internal reflectance (FTIR).

The contact sensor further includes a plurality of photosensors for sensing light from the diffused reflection.

The photosensor faces the sensing input unit and is provided on one side of the waveguide.

The wearable display device further includes a light intensity sensor provided at an end of the optical housing.

The intensity of light output by the light source is controllable by the light intensity received at the light amount sensor.

The inclined surface includes a first inclined surface and a second inclined surface and an angle of the first inclined surface is greater than an angle of the second inclined surface.

A reflective material is provided on the first inclined surface and a beam splitter is provided on the second inclined surface.

A display section of the output visual image is variable by the angle of the second inclined surface.

The visual image output by the light is enlarged on the first inclined surface and the second inclined surface.

There are a plurality of optical housings and the wearable display device further includes a frame for connecting the optical housings.

The optical housing and the frame are wearable by the user.

The output light travels through the waveguide through total reflection.

The optical housing is manufactured by injection molding.

Another aspect is a wearable display including an image source configured to output an image and an optical housing at least a portion of which is configured to be placed in front of a user's eye, wherein the optical housing includes a waveguide configured to receive the light from the image source and guide the output image, at least one inclined surface configured to reflect the guided image to the user's eye, and a first sensor formed on the waveguide and configured to sense contact between an object and the waveguide, wherein the waveguide and the inclined surface are integrally formed.

The optical housing can be formed of one or more of poly(methylmethacrylate) (PMMA), polycarbonate (PC), and glass. The optical housing can include an external sidewall and the inclined surface can be inclined with respect to the external sidewall. The optical housing can further include a second sensor formed on the waveguide opposing the first sensor and the second sensor can be configured to diffusely reflect the light toward the first sensor. The second sensor can be further configured to diffusely reflect the light via frustrated total internal reflectance (FTIR). The first sensor can include a plurality of photosensors. The photosensors can face the second sensor. The wearable display can further include a third sensor placed at an end of the optical housing and configured to sense the intensity of received light. The image source can be configured to control the intensity of the output image based at least in part on the sensed light intensity. The optical housing can include an external sidewall, wherein the at least one inclined surface includes a first inclined surface and a second inclined surface, and wherein the angle between the first inclined surface and the external sidewall is greater than the angle between the second inclined surface and the external sidewall. The optical housing can further include a reflective surface formed over the first inclined surface and a beam splitter formed over the second inclined surface. The first and second inclined surfaces can be configured to enlarge the output image. The wearable display can further include a second optical housing and a frame connecting the two optical housings.

Another aspect is a wearable display including an image source configured to output an image, an optical housing at least a portion of which is configured to be placed in front of a user's eye, wherein the optical housing includes a waveguide configured to receive the light from the image source and guide the output image and at least one inclined surface configured to reflect the guided image to the user's eyes, wherein the waveguide and the inclined surface are integrally formed.

The optical housing can further include a first sensor formed on the waveguide and a second sensor formed on the waveguide opposing the first sensor and the second sensor can be configured to diffusely reflect the light toward the first sensor. The first sensor can include a plurality of photosensors. The at least one inclined surface can further include a first inclined surface and a second inclined surface, wherein the first inclined surface is configured to reflect the light from the waveguide to the second inclined surface, and wherein the second inclined surface is configured to partially reflect the light from the first inclined surface to the user's eyes. The area of the second inclined surface can be greater than that of the first inclined surface.

According to at least one embodiment, the wearable display device for realizing augmented reality has a simple structure to simplify the manufacturing process thereof and provides easy manipulation through the integrated contact sensor.

Further, light travels through the optical housing to where the light is input to the user's eyes from where the light is received at the optical housing, thereby reducing loss of light and providing accurate visual images.

DETAILED DESCRIPTION OF CERTAIN INVENTIVE EMBODIMENTS

Figure 1:
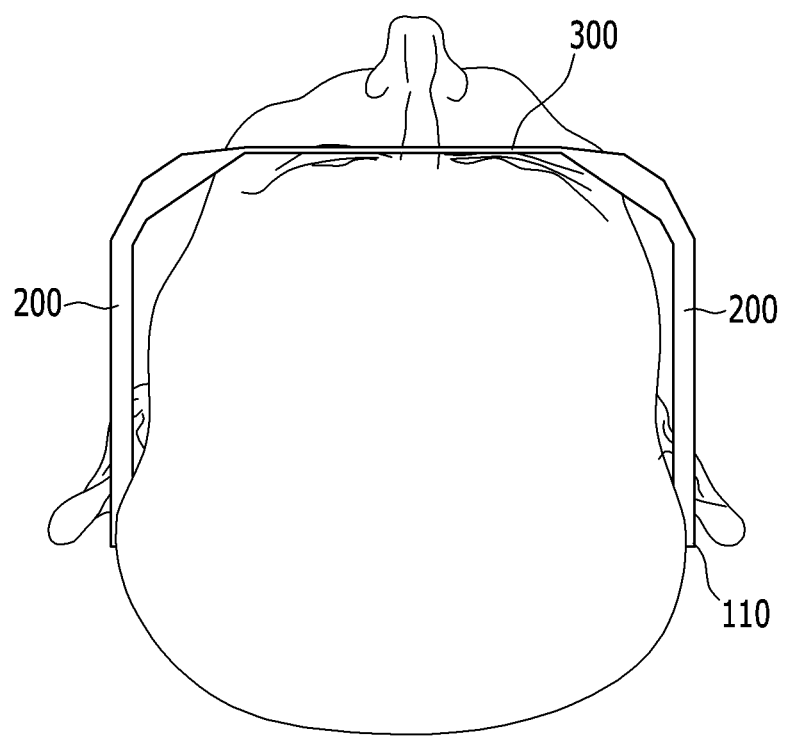
FIG. 1 shows a wearable display device according to an exemplary embodiment.

The described technology will be described more fully hereinafter with reference to the accompanying drawings, in which exemplary embodiments are shown. As those skilled in the art would realize, the described embodiments may be modified in various different ways, all without departing from the spirit or scope of the described technology.

In the drawings, the thicknesses of layers, films, panels, regions, etc., may be exaggerated for the sake of clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. The term "substantially" as used in this disclosure can include the meaning of completely, almost completely, or to any significant degree in some applications and in accordance with the understanding of those skilled in the art.

A wearable display device according to an exemplary embodiment will now be described with reference to FIG. 1 to FIG. 4.

A head mounted display device wearable on a user's head will now be exemplarily described as an embodiment of the wearable display device; however, the described technology is not limited thereto.

Referring to FIG. 1, the wearable display device 10 includes a light source 110, an optical housing 200, and a frame 300.

The light source 110 outputs light to the optical housing 200 for displaying a visual image.

There may be a plurality of optical housings 200 that are connected to each other through the frame 300 and that are wearable by the user.

Light output by the light source 110 travels to the optical housing 200 worn by the user and provides the visual image to the user's eyes.

In some embodiments, the optical housing 200 includes a waveguide 210 and an inclined surface 220 integrally formed with the optical housing 200. Any method for manufacturing the integrated optical housing 200 can be used, for example, the optical housing 200 can be made by an injection molding method.

The material of the optical housing 200 can be one or more of poly(methylmethacrylate) (PMMA), polycarbonate (PC), and glass. However, without restriction to the above materials, any material that can be molded as an integrated housing and have a relatively high transmittance can be used.

The optical housing 200 is wearable on the user's face similar to a pair of glasses, and when a plurality of optical housings 200 are worn, the frame 300 is required to connect the optical housings 200. The frame 300 connects a plurality of optical housings 200 and allows them to be worn through a support (not shown), such as a nose pad, to be supported from front of the user's face. The frame 300 supports the weight of the optical housing 200 and is configured such that the optical housing 200 is at least partially placed within the user's viewing angle.

In some embodiments, the optical housing 200 is formed to be a single housing unit, and like a pair of eyeglasses, extend from a point near the user's ears to an end point near the user's eyes. In some embodiments, a light source is provided at an end of the optical housing 200 near the user's ears.

However, the optical housing 200 and the frame 300 are not restricted to the above-described shape and the described technology can be embodied as one of various structures mountable on a user's head such as a helmet, a hair band, or an adjustable head strap.

As shown in FIG. 1, the frame 300 is connected to two optical housings 200. One of the optical housings 200 is partially placed within view of the user's one eye. Another of the optical housing 200 is partially placed within view of the user's other eye. The optical housings 200 can be symmetrical to each other and can be formed to be substantially the same physically. In other embodiments, the optical housings 200 can have any other kinds of combinations with different sizes and shapes.

According to some embodiments, the wearable display device provides visual images to the user's eyes using the two independent optical housings 200, and in the specification, this configuration is referred to as a binocular head mounted display device. The binocular head mounted display device can accurately provide the same visual image to both the user's eyes via both of the optical housings 200 so that the visual image is viewed in a manner like watching TV. The binocular head mounted display device can also provide a first visual image to one of the optical housings 200 and a second visual image to the other optical housing 200 such that different images are disclosed in each of the housings. When providing different images to the two optical housings 200, the binocular head mounted display device can provide slightly different versions of the same visual image so that 3D images can be watched.

However, without being restricted to this, in some embodiments the wearable display device includes a single optical housing 200. In these embodiments, one optical housing 200 is provided in view of one eye of the user, and these embodiments are referred to as a monocular head mounted display device.

According to another exemplary embodiment, a plurality of optical housings 200 are attachable to the frame 300, and when desired by the user, it is possible for the user to connect a single optical housing 200 to the frame 300 or connect the two optical housings 200 thereto.

The frame 300 can be formed of at least one material that is durable and light-weight such as a magnesium alloy, an aluminum alloy, titanium, or a similar light weight metal. However, the material of the frame 300 is not restricted to the above-noted metal materials. Hence, the frame 300 may include PVC, polyethylene, or a polymer material that is light and is durable.

Referring to FIG. 2 to FIG. 4B, an optical housing installed in the wearable display device shown in FIG. 1 will now be described.

Figure 2:
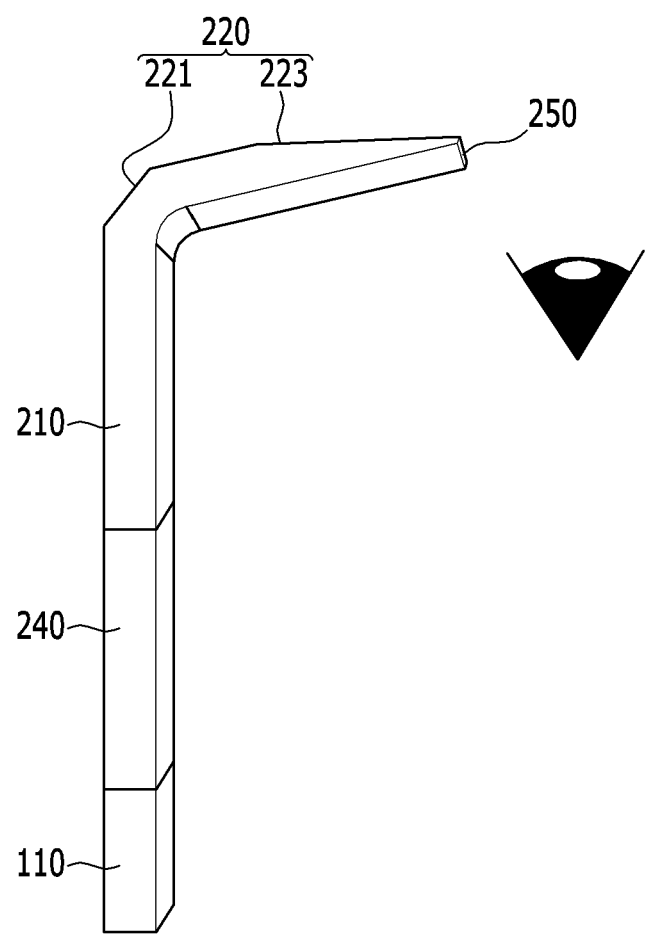
FIG. 2 shows a perspective view of a wearable display device according to an exemplary embodiment.
Figure 3:
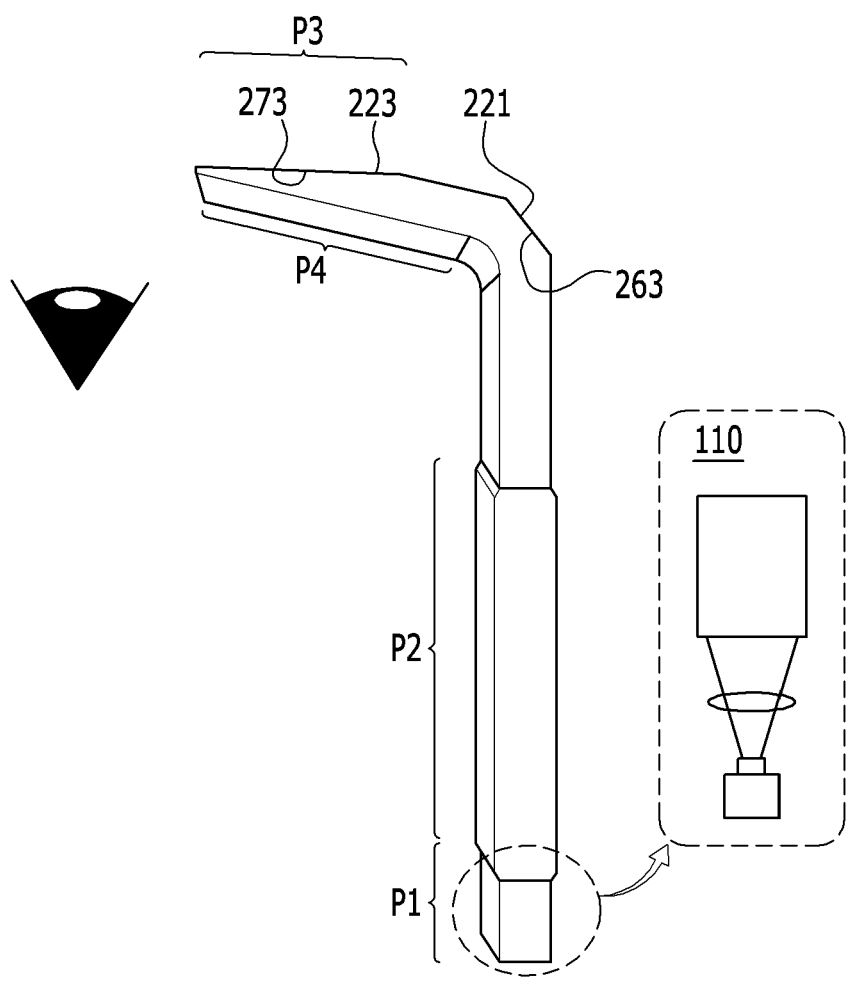
FIG. 3 shows a path along which light travels in FIG. 2.

Referring to FIG. 2 and FIG. 3, the optical housing 200 includes a waveguide 210, an inclined surface 220, and a contact sensor 240. A light source 110 for outputting a visual image is mounted to the optical housing 200.

The light source 110 outputs information including the visual image displayable to the user in an optical form. In some embodiments, the light source 110 is a micro-display connected to a power source. The micro-display includes a source input end for receiving input signals from an external source in a visual format. However, the light source 110 is not restricted to the above-description. Therefore, according to another embodiment, the light source 110 may be a laser-writer, a micro-projector, or other devices or systems for displaying visual information. In addition, the light source 110 receives input signals from an external source through a wire, a cable, an optic fiber, a radio signal transmission device, or a signal transmitting means known to a person of ordinary skill in the art in the signal transmission field.

Projected visual information includes still visual information, dynamic visual information, and other kinds of displayable and visual information. The still visual information includes information that does not change during the time it is displayed. The still visual information includes photos that are not updated with new information, still imagery, still text, and graphic data. The dynamic visual information includes information that changed during the time it is displayed. The dynamic visual information includes a video playback that is updated with new information, real time video, a changeable image, dynamic text, and a graphic design, to which the described technology is not restricted.

The waveguide 210 forms a path through which light output by the light source 110 and including visual information travels.

The waveguide 210 is connected to the light source 110 extends in a direction that is substantially parallel to propagation path of the light that is output by the light source 110. The light transmitted inside the waveguide 210 is totally reflected.

The inclined surface 220 is connected to a first end of the extended waveguide 210, and in an embodiment of the described technology, it includes two inclined surfaces 220, that is, a first inclined surface 221 and a second inclined surface 223.

The first inclined surface 221 is located at the first end of the waveguide 210 and the light source 110 is located at a second end of the waveguide 210 opposing the first end. A reflection member 263, to be described later, is provided on the first inclined surface 221 and the light propagating through the waveguide 210 is reflected from the reflection member 263 provided on the first inclined surface 221.

The second inclined surface 223 is arranged at a position that is along the path of light reflected from the first inclined surface 221 and faces the same. In some embodiments, the second inclined surface 223 is slanted at a smaller angle than the first inclined surface 221 with respect to an external sidewall of the optical housing 200. As used herein, the angles of the first and second inclined surfaces 221 and 223 are measured with respect to the external sidewall of the optical housing 200. The light reflected from the first inclined surface 221 is reflected from the second inclined surface 223 to be incident to both of the user's eyes or a single eye.

The visible range of the image output can be changed according to the angle of the second inclined surface 223 with respect to the first inclined surface 223. When the angle of the second inclined surface 223 is relatively large as illustrated in the embodiment of FIG. 3, the visible range provided by the second inclined surface 223 is larger than compared to when the angle is smaller, and the user's eyes may slightly change focus from the optical housing 200.

A reflection member or reflective surface 263 onto which the light is incident or a beam splitter 273 can be provided on each of the first inclined surface 221 and the second inclined surface 223.

In some embodiments, the reflection member 263 is provided on the first inclined surface 221 and reflects the light so that the light received from the waveguide 210 is incident on the user's eyes. That is, the light traveling through the waveguide 210 is reflected from the reflection member 263 toward the user's eyes.

In other embodiments, the beam splitter 273 is provided on the second inclined surface 223 so that the light reflected by the reflection member 263 provided on the first inclined surface 221 is incident on both of the user's eyes or a single eye. Particularly, the beam splitter 273 has transflective and reflective characteristics which allows an external image and the visual image output by light source to be combined and then provided to the user's eyes.

Due to the optics of the reflection member 263 and the beam splitter 273, the image produced by the light can be enlarged compared to the original image output from the light source 110.

The contact sensor 240 is provided on the waveguide 210, and in some embodiments, is provided in the middle of the waveguide 210 between the ears and the eyes of the user. This positioning of the optical housing 200 allows for easy contact manipulation by the user.

The contact sensor 240 includes a sensing input unit 241 for sensing the user's contact and a photosensor 245 for sensing the reflection of light from the sensing input unit 241.

Figure 4A:
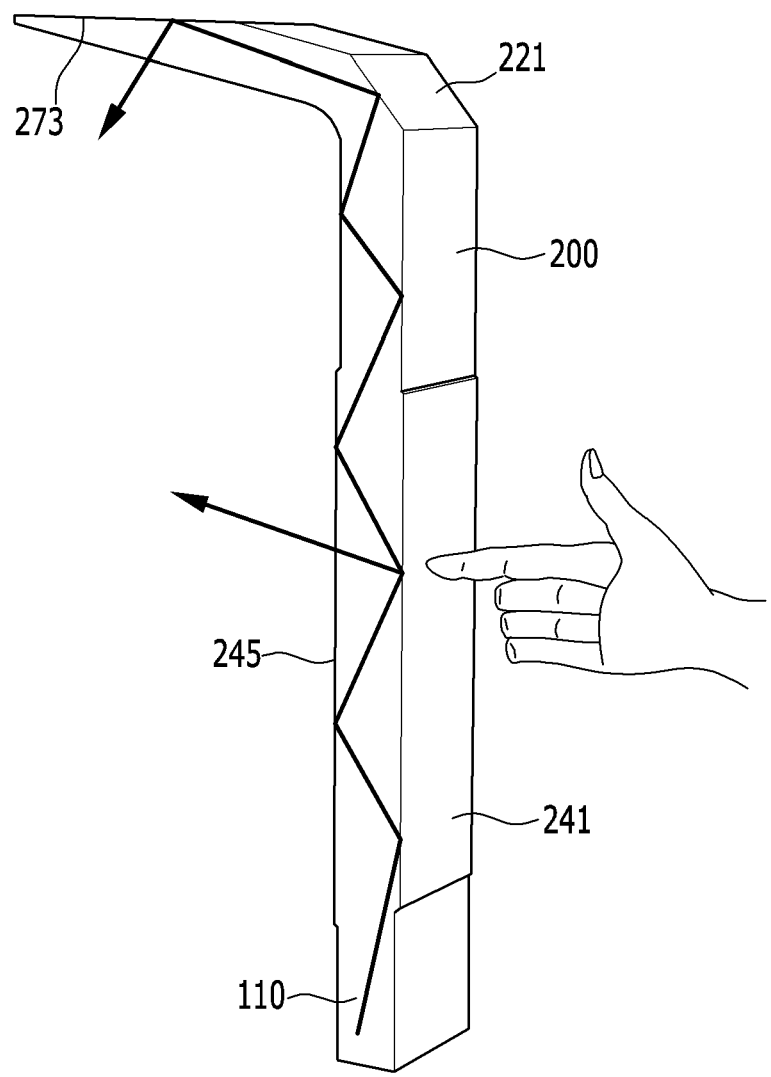
FIG. 4A and FIG. 4B show perspective views of a contact sensor according to an exemplary embodiment.

The sensing input unit 241 is provided on one side of the optical housing 200, and for example, as shown in FIG. 4A, can be provided on one side of the waveguide 210. In the FIG. 4A embodiment, the sensing input unit 241 is provided on the side of the waveguide that is easily contacted by the user, e.g., on an external side of the waveguide 210 opposing the head of the user when the optical housing 200 is being worn.

A diffuse reflection is generated at the sensing input unit 241 when contacted by the user. In detail, the light output by the light source 110 travels through the waveguide 210 by total internal reflection. When contact occurs with the sensing input unit 241, frustrated total internal reflectance (FTIR) of the light is generated.

In detail, frustrated total internal reflectance is generated when a third medium having a greater refractive index is provided on the path the light is travelling along. The reflective characteristics are changed by the third medium and energy is transferred through the newly provided medium. That is, the light path is divided into two paths. One is totally reflected inside the waveguide 210 and another passes through the contact point and is then incident on the external side of the waveguide 210, that is, the side that faces the contact point.

Figure 4B:
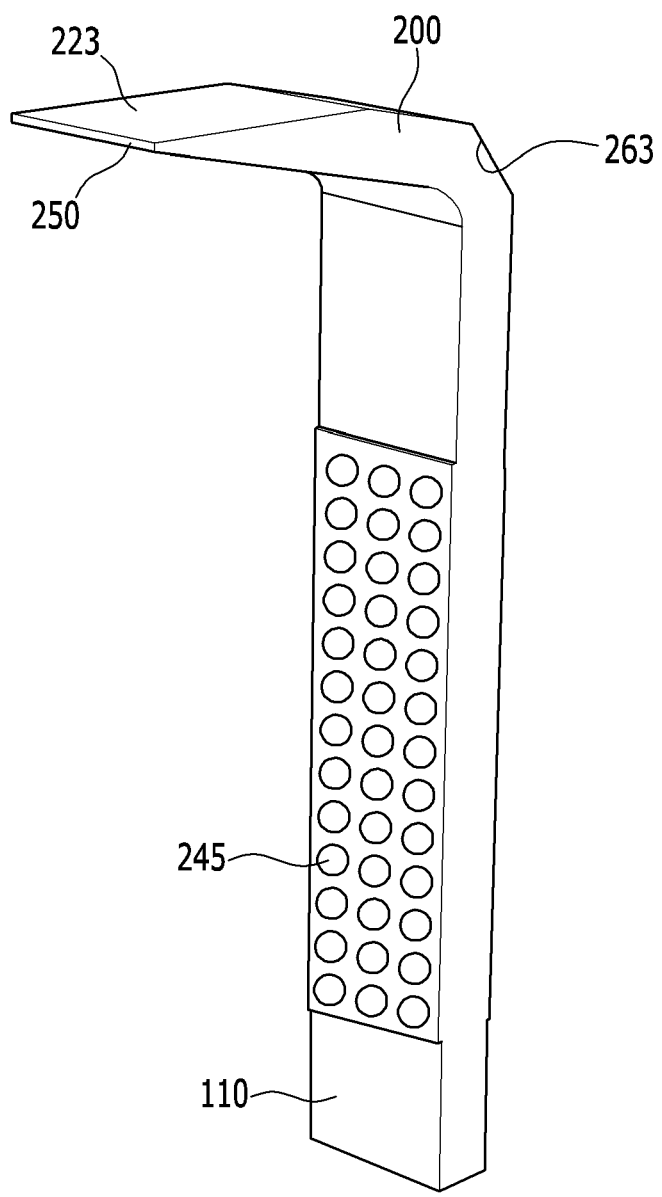

Light that is incident on the other side of the waveguide 210 that faces the sensing input unit 241 at the contact point is sensed by the photosensor 245. As shown in FIG. 4B, the photosensor 245 is provided on one side of the waveguide 210, and for example, is located at the position that faces the sensing input unit 241. That is, when the user wears the optical housing 200, the photosensor 245 is formed on one side of the waveguide 210 facing the user's face. The one side also faces the sensing input unit 241. The photosensor 245 recognizes the position of the contact point by transforming the diffused and reflected light into coordinate values.

A plurality of photosensors 245 can be provided as shown in FIG. 4B. The photosensors 245 are arranged on a side of the waveguide 210 that faces the sensing input unit 241. However, the placement of the photosensors 245 is not limited to the above description.

The photosensors 245 are arranged at a position for sensing light that is scattered by the contact. Light scattered by the contact is incident on the photosensor 245 so as to sense the contact point by transforming the incident light into coordinate values.

In summary, the light source 110 is provided on the one end of the waveguide 210 and the contact of the sensing input unit 241 is sensed by the photosensor 245 that is provided in a direction from the sensing input unit 241 that is substantially perpendicular to propagation path of the light. Particularly, the photosensor 245 and the sensing input unit 241 are provided on respective sides of the waveguide 210 to improve space efficiency and improve contact sensing functionality. Further, since the contact sensor 240 is influenced by the medium of the object contacting the sensing input unit 241, the different types of contact can be selectively sensed based on the medium.

In some embodiments, light amount sensor or light intensity sensor 250 is provided at an end of the optical housing 200, and in detail, at the end of the optical housing 200 near the user's eyes. The light amount sensor 250 senses the amount of light incident on the end of the optical housing 200 and controls the luminance of the visual image that is input to the user's eyes according to the sensed amount. For example, when the amount or light sensed by the light amount sensor 250 is less than a predetermined value, the light source 110 outputs a greater amount of light and controls it.

Further, without being restricted to this, the light amount sensor 250 can be used depending on the environmental conditions of the wearable display device.

In some embodiments, when the wearable display device is used in a dark environment, the light amount sensor 250 senses the external environment and decreases the luminance of the light provided to the user's eyes, and when the wearable display device is used in a bright environment, the light amount sensor 250 senses the external environment and increases the luminance of the light provided to the user's eyes.

The wearable display device including the above-described configuration provides the visual image output by the light source 110 to the eyes of the user and the visual image is combined with an external image to implement an augmented reality to the eyes of the user.

Further, the optical housing 200 is integrally formed with the waveguide 210 and the inclined surface 220, thereby reducing the loss of light that travels through the optical housing 200 and providing accurate visual images.

Referring to FIG. 3, the optical housing 200 will now be described with respect to the path traveled by the light.

Light that forms the visual image is emitted from the light source 110 and is incident on the waveguide 210 (P1). The incident light travels through the waveguide 210 with total internal reflection and a region (P2) for sensing contact is provided on the waveguide 210.

When a user's contact is generated in the region (P2), the light travelling through the waveguide 210 undergoes frustrated total internal reflectance at the point of contact. Some of light is incident to a side of the waveguide 210 that faces where the contact is generated and the remaining light is totally internally reflected along the light transmission path. Upon sensing part of the scattered light, the photosensor 245 generates a signal having the coordinates of the contact point.

The moving light is reflected from the reflection member 263 provided on the first inclined surface 221 and is then incident on the beam splitter 273 provided on the second inclined surface 223. The light incident on the second inclined surface 223 is reflected and semi-transmitted by the beam splitter 273 and is then input to both eyes or a single eye of the user (P3). The light reflected from the beam splitter 273 is combined with an external image to generate an augmented reality image for the user (P4).

A region (P3) corresponding to the region including the second inclined surface 223 provides an output image to the user. The output image and the external image are combined in a transparent region (P4) to provide the augmented reality image. The wearable display device shown in FIG. 3 is worn on the lateral side of the user and the images are viewed from the peripheral of the user's vision, thereby providing augmented reality images while not significantly blocking the user's view.

Figure 5:
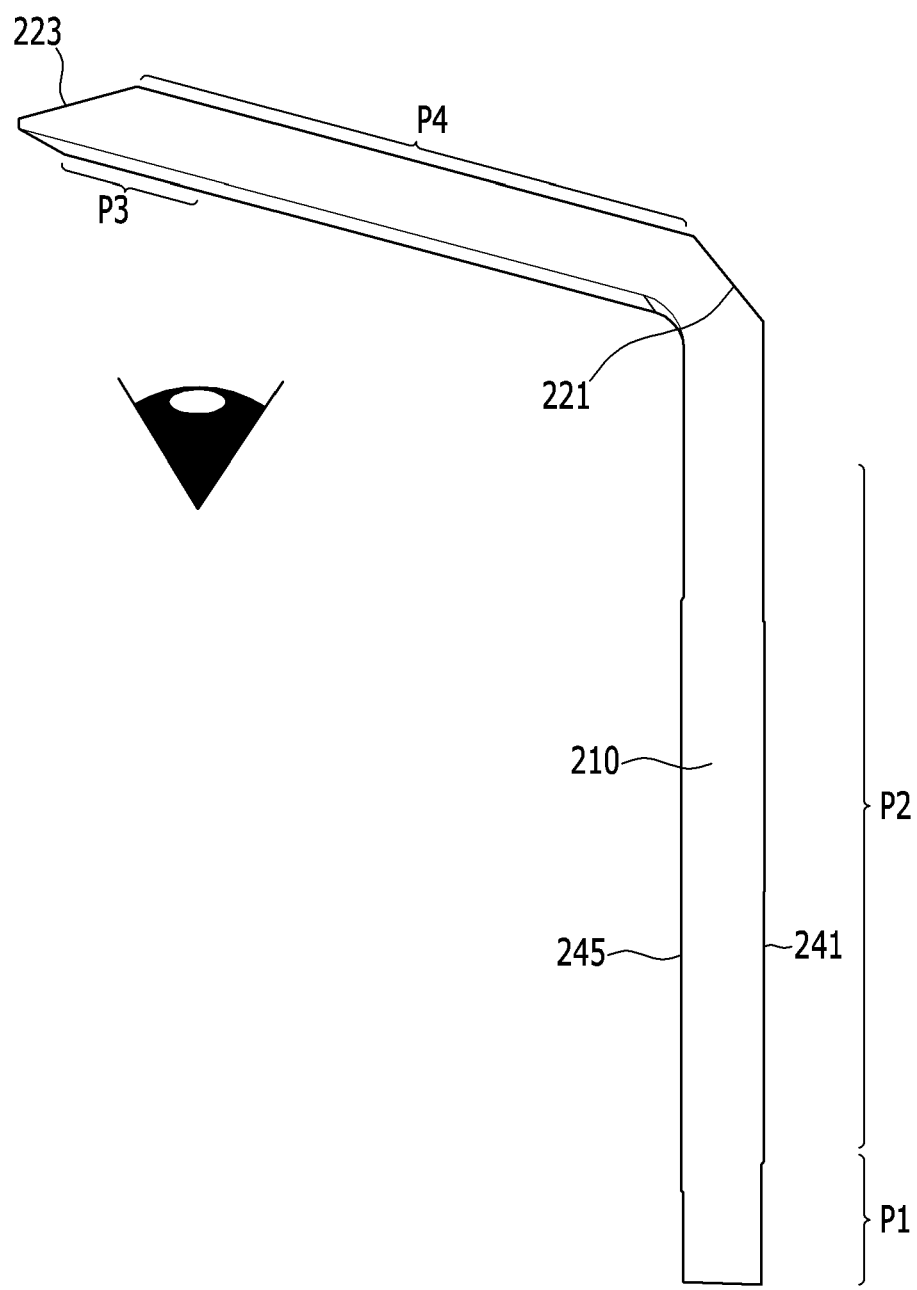
FIG. 5 and FIG. 6 show perspective views of a wearable display device according to additional exemplary embodiments.
Figure 6:
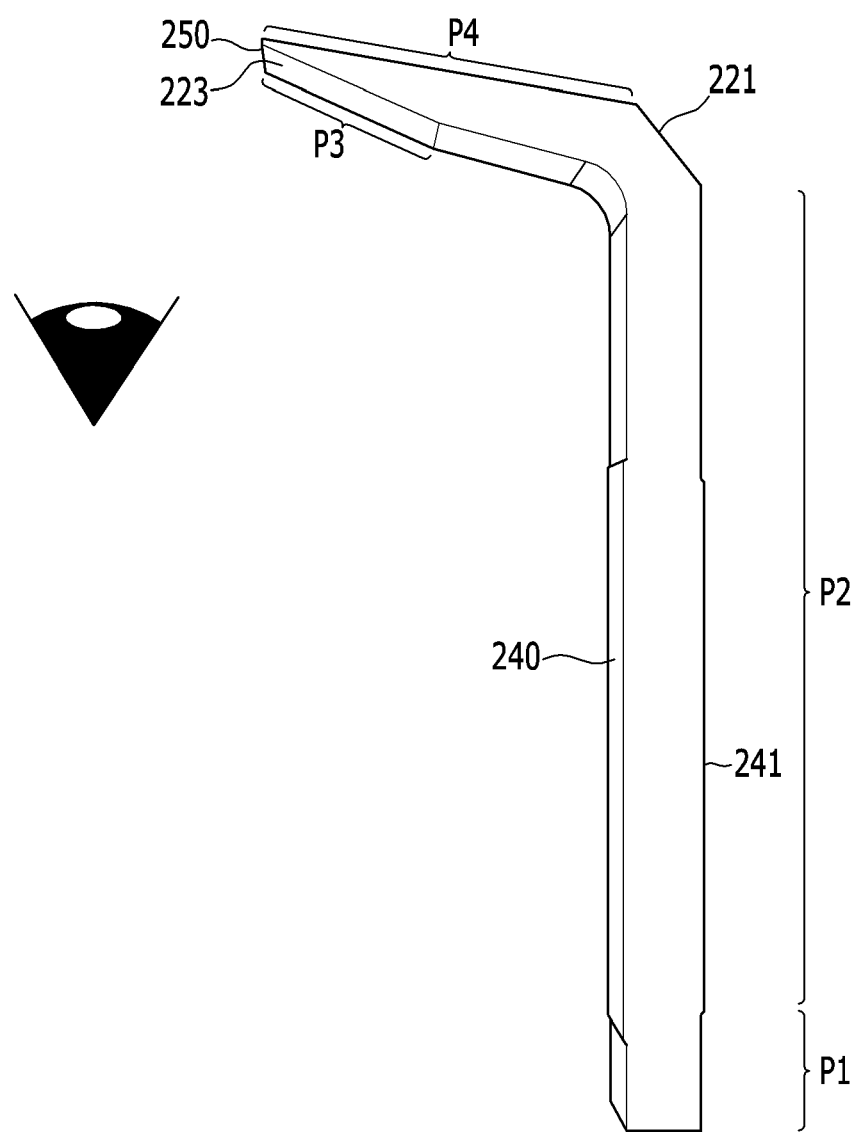

Referring to FIG. 5 and FIG. 6, a wearable display device according to additional embodiments will now be described. FIG. 5 and FIG. 6 show perspective views of the wearable display device. The description of the same constituent elements as in the wearable display device according to the above described embodiments will be omitted.

Referring to FIG. 5, the wearable display device includes the constituent elements included in the above described embodiment, but the length between the first inclined surface 221 and the second inclined surface 223 and the angle of the second inclined surface 223 are different.

The length between the first inclined surface 221 and the second inclined surface 223 is greater than that in the embodiment of FIGS. 2 and 3. The wearable display device having the longer length between the first and second inclined surfaces 221 and 223 is provided to the user's front view. That is, the end of the wearable display device 10 is inside the front view of the user, which is comparable to the end of the wearable display device shown in FIG. 2 which is provided in the user's peripheral view.

Referring to FIG. 5, light (P1) output from the light source 110 passes through the waveguide 210 including the contact sensor 240 and is then reflected from the first inclined surface 221 by the reflection member 263.

The light reflected from the first inclined surface 221 is reflected and semi-transmitted at the second inclined surface 223 by the beam splitter 273 and provides a visual image to the user's eyes (P3). In this instance, the region available for implementing augmented reality according to transflectance is the region (P4) which is a wider region than the augmented reality implemented region according to the embodiment of FIG. 3.

In summary, it is possible to control the area (P4) of the region implementing augmented reality or provide (P3) the visual image to the user's front view by controlling the length between the first inclined surface 221 and the second inclined surface 223 or the angle of the second inclined surface 223.

Referring to FIG. 6, the wearable display device 10 according to another embodiment will now be described.

The wearable display device 10 has a shorter distance between the first inclined surface 221 and the second inclined surface 223 than that of the wearable display device shown in FIG. 5. That is, the end of the wearable display device is provided in the peripheral view rather than the front view. Therefore, the user may view the visual image output by the wearable display device through his or her peripheral view.

In addition, the angle of the second inclined surface 223 according to the embodiment of FIG. 6 is less than the angle of the second inclined surface 223 shown in FIG. 2. In detail, the angle of the second inclined surface 223 of FIG. 6 is an acute angle and can be compared to the obtuse angle of the second inclined surface 223 of FIG. 2. Accordingly, the angle pm which the beam splitter 273 is provided on the second inclined surface 223 can be changed.

According to the embodiment of FIG. 6, the region in which the visual image is provided by reflection and transflectance of the beam splitter 273 is (P3) and the region in which augmented reality is implemented by the combination of the image and an external image is (P4).

According to the embodiment of FIG. 6, the position and the area (P3) for providing the visual image and the position and the area (P4) for implementing augmented reality can be controlled by controlling the distance between the first inclined surface 221 and the second inclined surface 223 and the angle of the second inclined surface 223.

The present specification has described the shape of the optical housing 200 shown in FIG. 2 to FIG. 6, and without being restricted to this, can be embodied in any type of shape that provide various visual image (P3) and augmented reality (P4) areas.

According to at least one embodiment, the wearable display device for implementing augmented reality includes a housing mounted on the user's head and integrally configured with the front or peripheral view thereof. Light is transmitted from the first end of the optical housing near the ear of the user and the light is input to the eyes of the user. Loss of light is minimized and excellent transmission of visual images is possible by the optical housing extending to the region that is incident to the eyes from the ears of the user. Further, the display device provides an easy manufacturing process and a simple installation. In addition, it is possible to provide easy manipulation and excellent visual images by using the contact sensor and the light amount control sensor installed in the housing.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A wearable display, comprising:
an image source configured to output an image; and
an optical housing at least a portion of which is configured to be placed in front of a user's eye, wherein the optical housing includes:
a waveguide configured to receive the light from the image source and guide the output image;
at least one inclined surface configured to reflect the guided image to the user's eye; and
a first sensor disposed on the waveguide and configured to sense contact between an object and the waveguide,
wherein the waveguide and the at least one inclined surface are integrally formed, and
wherein the first sensor is located between the image source and the at least one inclined surface.

2. The wearable display of claim 1, wherein the optical housing is formed of one or more of poly(methylmethacrylate) (PMMA), polycarbonate (PC), and glass.

3. The wearable display of claim 2, wherein the optical housing includes an external sidewall and wherein the inclined surface is inclined with respect to the external sidewall.

4. The wearable display of claim 1, wherein the optical housing further includes a second sensor disposed on the waveguide opposing the first sensor and wherein the second sensor is configured to diffusely reflect the light toward the first sensor.

5. The wearable display of claim 4, wherein the second sensor is further configured to diffusely reflect the light via frustrated total internal reflectance (FTIR).

6. The wearable display of claim 4, wherein the first sensor includes a plurality of photosensors.

7. The wearable display of claim 6, wherein the photosensors face the second sensor.

8. The wearable display of claim 1, further including a third sensor placed at an end of the optical housing and configured to sense the intensity of received light.

9. The wearable display of claim 8, wherein the image source is configured to control the intensity of the output image based at least in part on the sensed light intensity.

10. The wearable display of claim 1, wherein the optical housing includes an external sidewall, wherein the at least one inclined surface includes a first inclined surface and a second inclined surface, and wherein the angle between the first inclined surface and the external sidewall is greater than the angle between the second inclined surface and the external sidewall.

11. The wearable display of claim 10, wherein the optical housing further includes a reflective surface formed over the first inclined surface and a beam splitter formed over the second inclined surface.

12. The wearable display of claim 11, wherein the first and second inclined surfaces are configured to enlarge the output image.

13. The wearable display of claim 1, further comprising a second optical housing and a frame connecting the two optical housings.

14. The wearable display of claim 13, wherein the optical housings and the frame are configured to be at least partially supported by the user's ears.

15. The wearable display of claim 1, wherein the waveguide is further configured to guide the output image via total internal reflection.

16. A wearable display, comprising:
an image source configured to output an image; and
an optical housing at least a portion of which is configured to be placed in front of a user's eye, wherein the optical housing includes:
 a waveguide configured to receive the light from the image source and guide the output image;
 at least one inclined surface configured to reflect the guided image to the user's eyes;
 a first sensor disposed on the waveguide; and
 a second sensor disposed on the waveguide opposing the first sensor,
 wherein the second sensor is configured to diffusely reflect the light toward the first sensor, and
 wherein the waveguide and the inclined surface are integrally formed.

17. The wearable display of claim 16, wherein the first sensor comprises a plurality of photosensors.

18. The wearable display of claim 16, wherein the at least one inclined surface further comprises a first inclined surface and a second inclined surface, wherein the first inclined surface is configured to reflect the light from the waveguide to the second inclined surface, and wherein the second inclined surface is configured to partially reflect the light from the first inclined surface to the user's eyes.

19. The wearable display of claim 18, wherein the area of the second inclined surface is greater than that of the first inclined surface.

* * * * *